(12) United States Patent
Gregory et al.

(10) Patent No.: US 11,560,873 B1
(45) Date of Patent: Jan. 24, 2023

(54) WIND ENERGY DEVICE AND RELATED METHODS

(71) Applicant: Brent Gregory, Scottsdale, AZ (US)

(72) Inventors: Brent Gregory, Scottsdale, AZ (US);
Bryan D. Knodel, Flagstaff, AZ (US);
Tim Knodel, Cupertino, CA (US)

(73) Assignee: Brent Gregory, Scottsdale, AZ (US)

( * ) Notice: Subject to any disclaimer, the term of this patent is extended or adjusted under 35 U.S.C. 154(b) by 0 days.

(21) Appl. No.: 17/112,643

(22) Filed: Dec. 4, 2020

Related U.S. Application Data

(60) Provisional application No. 62/943,393, filed on Dec. 4, 2019.

(51) Int. Cl.
  *F03D 5/02* (2006.01)
  *F03D 3/00* (2006.01)
  *F03D 9/25* (2016.01)
  *F03D 3/06* (2006.01)

(52) U.S. Cl.
  CPC ............... *F03D 5/02* (2013.01); *F03D 3/002* (2013.01); *F03D 3/062* (2013.01); *F03D 9/25* (2016.05); *F05B 2240/124* (2013.01); *F05B 2250/71* (2013.01)

(58) Field of Classification Search
  CPC ... F03D 5/02; F03D 3/002; F03D 9/25; F03D 3/062; F05B 2250/71; F05B 2240/124
  USPC ...................................................... 290/44, 55
  See application file for complete search history.

(56) References Cited

U.S. PATENT DOCUMENTS

| 1,267,928 | A | * | 5/1918 | Speegle | .................. | F03B 7/006 |
| | | | | | | 415/5 |
| 3,730,643 | A | * | 5/1973 | Davison | .................... | F03D 5/04 |
| | | | | | | 416/8 |
| 3,927,330 | A | * | 12/1975 | Skorupinski | .......... | F03B 17/066 |
| | | | | | | 290/54 |
| 4,049,300 | A | * | 9/1977 | Schneider | ................. | F03D 9/22 |
| | | | | | | 290/54 |
| 4,134,469 | A | * | 1/1979 | Davis | ........................ | B60L 8/00 |
| | | | | | | 180/2.2 |
| 4,163,905 | A | * | 8/1979 | Davison | ................ | F03B 17/068 |
| | | | | | | 290/54 |

(Continued)

FOREIGN PATENT DOCUMENTS

| DE | 381102 C | 9/1923 |
| EP | 2067987 A2 | 6/2009 |

(Continued)

*Primary Examiner* — Pedro J Cuevas
(74) *Attorney, Agent, or Firm* — IPTechLaw

(57) ABSTRACT

Implementations of wind energy devices may include a frame coupled to each of a first rotor wheel, a second rotor wheel, a third rotor wheel, and a fourth rotor wheel. Implementations of wind energy devices may also include a first cable configured to rotate about the first rotor wheel and the second rotor wheel and a second cable configured to rotate about the third rotor wheel and the fourth rotor wheel. Implementations of wind energy devices may also include a plurality of airfoils coupled between the first cable and the second cable. Implementations of wind energy devices may include a first generator and a second generator. Implementations of wind energy devices may include a controller coupled to the first generator and the second generator. The controller may be configured to control a speed of rotation of the plurality of airfoils.

20 Claims, 9 Drawing Sheets

(56) References Cited

U.S. PATENT DOCUMENTS

| | | | | |
|---|---|---|---|---|
| 4,186,314 A * | 1/1980 | Diggs | F03D 5/02 | 290/44 |
| 4,303,834 A * | 12/1981 | Li | F03D 5/02 | 290/55 |
| 4,494,008 A * | 1/1985 | Patton | F01D 23/00 | 290/44 |
| 4,536,125 A | 8/1985 | Herman et al. | | |
| 4,589,344 A * | 5/1986 | Davison | F03D 5/04 | 104/118 |
| 4,756,666 A * | 7/1988 | Labrador | F03D 5/04 | 416/8 |
| 4,859,146 A * | 8/1989 | Labrador | F03D 5/04 | 416/8 |
| 5,134,305 A * | 7/1992 | Senehi | F03D 5/02 | 290/55 |
| 5,744,871 A * | 4/1998 | Robles Akesolo | F03D 5/02 | 290/44 |
| 5,758,911 A * | 6/1998 | Gerhardt | F03D 5/02 | 104/24 |
| 5,992,341 A * | 11/1999 | Gerhardt | F03D 5/02 | 114/102.16 |
| 6,072,245 A * | 6/2000 | Ockels | F03D 13/20 | 290/55 |
| 6,672,522 B2 * | 1/2004 | Lee | F03D 5/04 | 290/44 |
| 6,809,430 B2 * | 10/2004 | Diederich | F03B 17/066 | 290/54 |
| 7,075,191 B2 * | 7/2006 | Davison | F03B 17/066 | 290/54 |
| 7,615,883 B2 * | 11/2009 | Meheen | F03D 13/20 | 290/55 |
| 7,654,082 B2 * | 2/2010 | Perry | F03B 17/066 | 60/398 |
| 7,709,971 B2 * | 5/2010 | Sane | F03D 9/25 | 290/43 |
| 7,862,290 B2 * | 1/2011 | Diederich | F03B 17/066 | 415/5 |
| 7,902,684 B2 * | 3/2011 | Davison | F03D 9/25 | 290/44 |
| 8,253,264 B2 * | 8/2012 | Becker | F03D 5/02 | 290/54 |
| 8,534,057 B1 * | 9/2013 | Brown | F03B 17/068 | 60/398 |
| 8,618,682 B2 * | 12/2013 | Syrovy | F03D 5/02 | 290/44 |
| 8,866,325 B2 * | 10/2014 | Syrovy | F03D 9/25 | 290/44 |
| 9,212,652 B2 * | 12/2015 | Alexander | F03D 9/25 | |
| 9,297,354 B2 * | 3/2016 | Cunnane | F03B 13/10 | |
| 9,366,226 B2 * | 6/2016 | Yan | F03D 5/04 | |
| 9,394,883 B2 * | 7/2016 | Yan | F03D 5/04 | |
| 9,518,557 B2 * | 12/2016 | Cunnane | F03B 17/064 | |
| 9,777,709 B2 * | 10/2017 | Dysarsz | F03D 9/255 | |
| 9,897,071 B2 * | 2/2018 | Davison | F03D 9/25 | |
| 10,683,841 B2 * | 6/2020 | Farrant | F03D 5/02 | |
| 2004/0164562 A1 * | 8/2004 | Latyshev | F03D 5/04 | 290/55 |
| 2008/0007069 A1 * | 1/2008 | Diederich | F03D 5/02 | 416/7 |
| 2008/0157526 A1 * | 7/2008 | Davison | F03D 13/20 | 290/3 |
| 2008/0303287 A1 * | 12/2008 | Meheen | F03D 5/02 | 290/55 |
| 2010/0158697 A1 | 6/2010 | Kim | | |
| 2010/0308595 A1 | 12/2010 | Chen | | |
| 2011/0309634 A1 * | 12/2011 | Syrovy | F03D 5/02 | 290/55 |
| 2014/0306456 A1 * | 10/2014 | Alexander | F03D 9/25 | 290/55 |
| 2015/0159620 A1 * | 6/2015 | Widmer | F03B 13/00 | 290/54 |
| 2016/0290317 A1 * | 10/2016 | Davison | F03D 5/02 | |
| 2018/0156195 A1 * | 6/2018 | Davison | F03D 9/257 | |

FOREIGN PATENT DOCUMENTS

| | | |
|---|---|---|
| GB | 1584751 A | 2/1981 |
| GB | 2206652 A | 1/1989 |
| WO | 2010030895 A2 | 3/2010 |
| WO | 2014006608 A1 | 1/2014 |

* cited by examiner

WIND ENERGY DEVICE AND RELATED METHODS

CROSS REFERENCE TO RELATED APPLICATIONS

This document claims the benefit of the filing date of U.S. Provisional Patent Application 62/943,393, entitled "Wind Energy Device and Related Methods" to Brent Gregory which was filed on Dec. 4, 2019, the disclosure of which is hereby incorporated entirely herein by reference.

BACKGROUND

1. Technical Field

Aspects of this document relate generally to wind energy devices. More specific implementations involve wind energy devices having multiple axes.

2. Background

Wind energy devices are used to convert wind energy into electrical energy. Wind turbines are examples of wind energy devices. Common examples of wind turbines include a plurality of blades that rotate about a single axis. Other examples of wind turbines include rotation about multiple axes. Wind energy devices may include horizontal or vertical axes.

SUMMARY

Implementations of wind energy devices may include a frame coupled to each of a first rotor wheel, a second rotor wheel, a third rotor wheel, and a fourth rotor wheel. Implementations of wind energy devices may also include a first cable configured to rotate about the first rotor wheel and the second rotor wheel and a second cable configured to rotate about the third rotor wheel and the fourth rotor wheel. Implementations of wind energy devices may also include a plurality of airfoils coupled between the first cable and the second cable. The plurality of airfoils may be configured to rotate with the first cable in the second cable. Implementations of wind energy devices may include a first generator coupled to either the first rotor wheel, the second rotor wheel, the third rotor wheel, or the fourth rotor wheel. Implementations of wind energy devices may also include a second generator coupled to one of the first rotor wheel, the second rotor wheel, the third rotor wheel, or the fourth rotor wheel. Implementations of wind energy devices may include a controller coupled to the first generator and the second generator. The controller may be configured to control a speed of rotation of the plurality of airfoils.

Implementations of wind energy devices may include one, all, or any of the following:

Substantially half of a first side of a leading edge of each airfoil of the plurality of airfoils may include a first solar panel and substantially half of a second side of the trailing edge of each airfoil may include a second solar panel.

The first rotor wheel and the third rotor wheel may have a greater diameter than the second rotor wheel and the fourth rotor wheel.

A space between a first leading edge of a first airfoil and a second leading edge of an adjacent second airfoil may be greater than a space between a first trailing edge of the first airfoil and a second trailing edge of an adjacent second airfoil.

Implementations of wind energy devices may include a third generator coupled to the third rotor wheel and a fourth generator coupled to the fourth rotor wheel.

The plurality of airfoils may be configured to generate a downward impulse when a stream of air strikes a plurality of leading airfoils of the plurality of airfoils.

Implementations of wind energy devices may include a frame coupled to each of a first rotor wheel, a second rotor wheel, a third rotor wheel, and a fourth rotor wheel. Implementations of wind energy devices may also include a first shaft coupled between the first rotor wheel and the third rotor wheel and a second shaft coupled between the second rotor wheel and the fourth rotor wheel. Implementations of wind energy devices may also include a first cable configured to rotate about the first rotor wheel and the second rotor wheel and a second cable configured to rotate about the third rotor wheel and the fourth rotor wheel. Implementations of wind energy devices may also include a plurality of airfoils coupled between the first cable and the second cable. The plurality of airfoils may be configured to rotate with the first cable in the second cable. Implementations of wind energy devices may include a generator coupled to either the first rotor wheel, the second rotor wheel, the third rotor wheel, or the fourth rotor wheel. Implementations of wind energy devices may include a controller coupled to the generator. The controller may be configured to limit the speed of rotation of the plurality of airfoils and maintain the speed of rotation of the plurality of airfoils. Each airfoil of the plurality of airfoils includes a chord length that is the same distance as a distance between two adjacent airfoils.

Implementations of wind energy devices may include one, all, or any of the following:

The controller may be configured to compute an available torque on the first shaft and control the output of an electric current.

Implementations of wind energy devices may include a second generator, a third generator, and a fourth generator, each generator coupled to either the first rotor wheel, the second rotor wheel, the third rotor wheel, or the fourth rotor wheel.

The controller may be configured to determine which of the first generator, the second generator, the third generator, and the fourth generator generate power based upon a velocity of the plurality of airfoils.

A thickness of a middle section of each airfoil of the plurality of airfoils may be 15% of the chord length of each airfoil of the plurality of airfoils.

A leading edge of each airfoil of the plurality of airfoils may be symmetrical with respect to the trailing edge of each airfoil of the plurality of airfoils.

An angle between a plain formed through a leading edge of the first cable and second cable and a plain formed between the trailing edge of the first cable and second cable may be 15 degrees.

Implementations of wind energy devices may include a frame coupled to each of a first rotor wheel, a second rotor wheel, a third rotor wheel, and a fourth rotor wheel. Implementations of wind energy devices may also include a first cable configured to rotate about the first rotor wheel and the second rotor wheel and a second cable configured to rotate about the third rotor wheel and the fourth rotor wheel. Implementations of wind energy devices may also include a plurality of airfoils coupled between the first cable and the second cable. The plurality of airfoils may be configured to rotate with the first cable in the second cable. Implementations of wind energy devices may include a generator coupled to either the first rotor wheel, the second rotor wheel, the third rotor wheel, or the fourth rotor wheel. Implementations of wind energy devices may include a controller coupled to the generator. The controller may be configured to limit the speed of rotation of the plurality of airfoils and maintain the speed of rotation of the plurality of airfoils. The plurality of airfoils may include a leading-edge portion of airfoils and a trailing edge portion of airfoils. The trailing edge portion of airfoils may be configured to generate more downward force than the leading edge portion of the airfoils generate upward force.

Implementations of wind energy devices may include one, all, or any of the following:

The frame may include an A-frame including a first support directly coupled to a second support at a top of the A-frame.

An angle of attack of the leading edge of the plurality of airfoils may be between 15 to 30 degrees.

The plurality of airfoils may be configured to generate a downward impulse when a stream of air strikes a plurality of leading airfoils of the plurality of airfoils.

The first cable may be configured to rotate 195 degrees about the first rotor wheel and the first cable may be configured to rotate 165 degrees about the second rotor wheel.

Implementations of wind energy devices may include a second generator. The controller may be configured to determine which of the generator and the second generator generate power based upon the velocity of the plurality of airfoils.

Implementations of wind energy devices may include an auto pitch set mechanism rotatably coupled to the frame and operably coupled to the controller. The controller may be configured to adjust an angle of attack of the plurality of airfoils during operation of the wind energy device based upon a wind speed.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended wind energy devices will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such wind energy devices, and implementing components and methods, consistent with the intended operation and methods.

Figure 1:
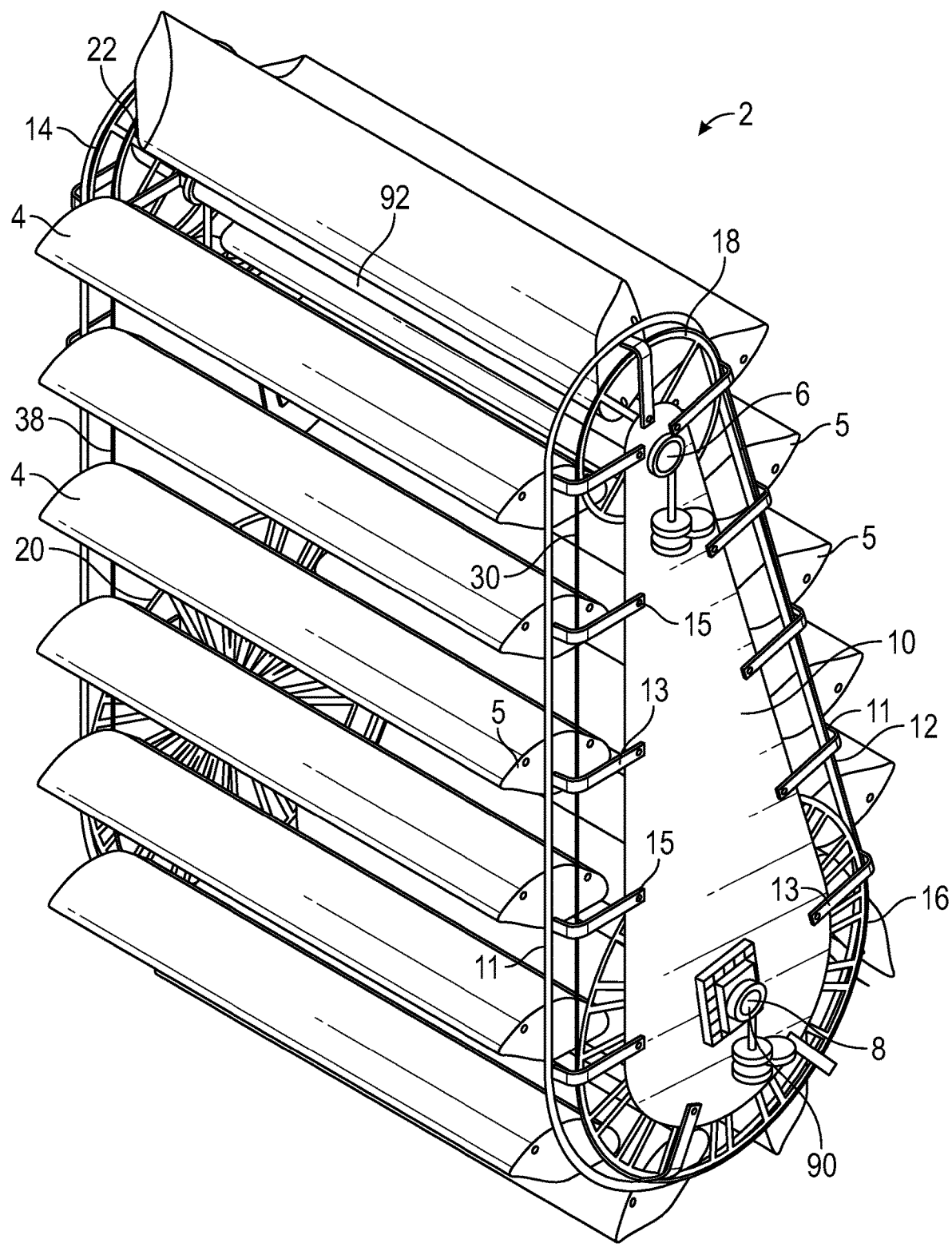
FIG. 1 is a front perspective view of a wind energy device.

Referring to FIG. 1, a front perspective view of a wind energy device is illustrated. As illustrated, the wind energy device 2 is a horizontal axis wind energy device inasmuch as it includes a plurality of airfoils 4 that rotate about a first horizontal axis 6 and a second horizontal axis 8. While FIG. 1 illustrates the plurality of airfoils 4 as horizontal, in other implementations the wind energy device 2 may be rotated any number of degrees and the plurality of airfoils 4 may not be horizontal.

Figure 2:
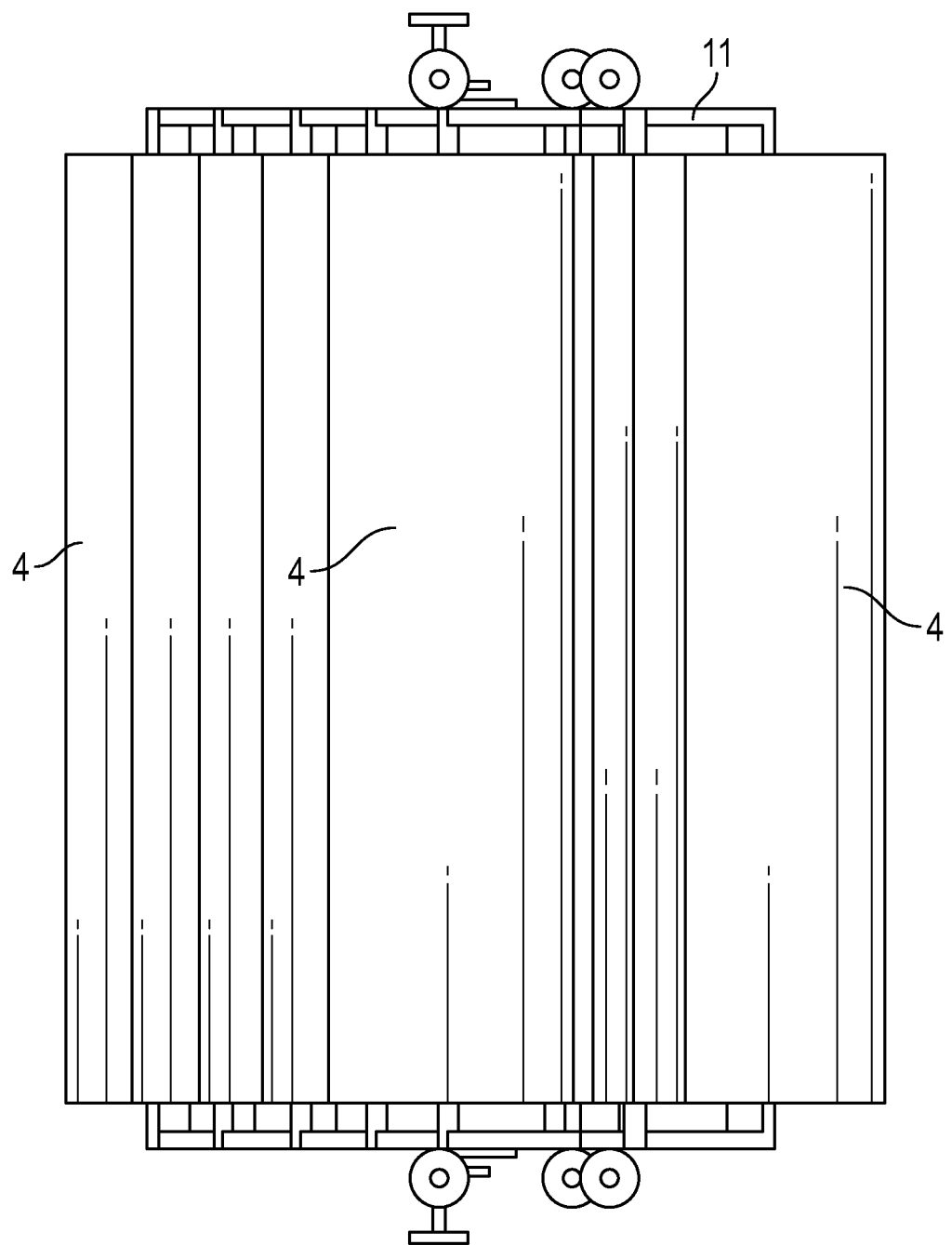
FIG. 2 is a top view of the wind energy device of FIG. 1.
Figure 3:
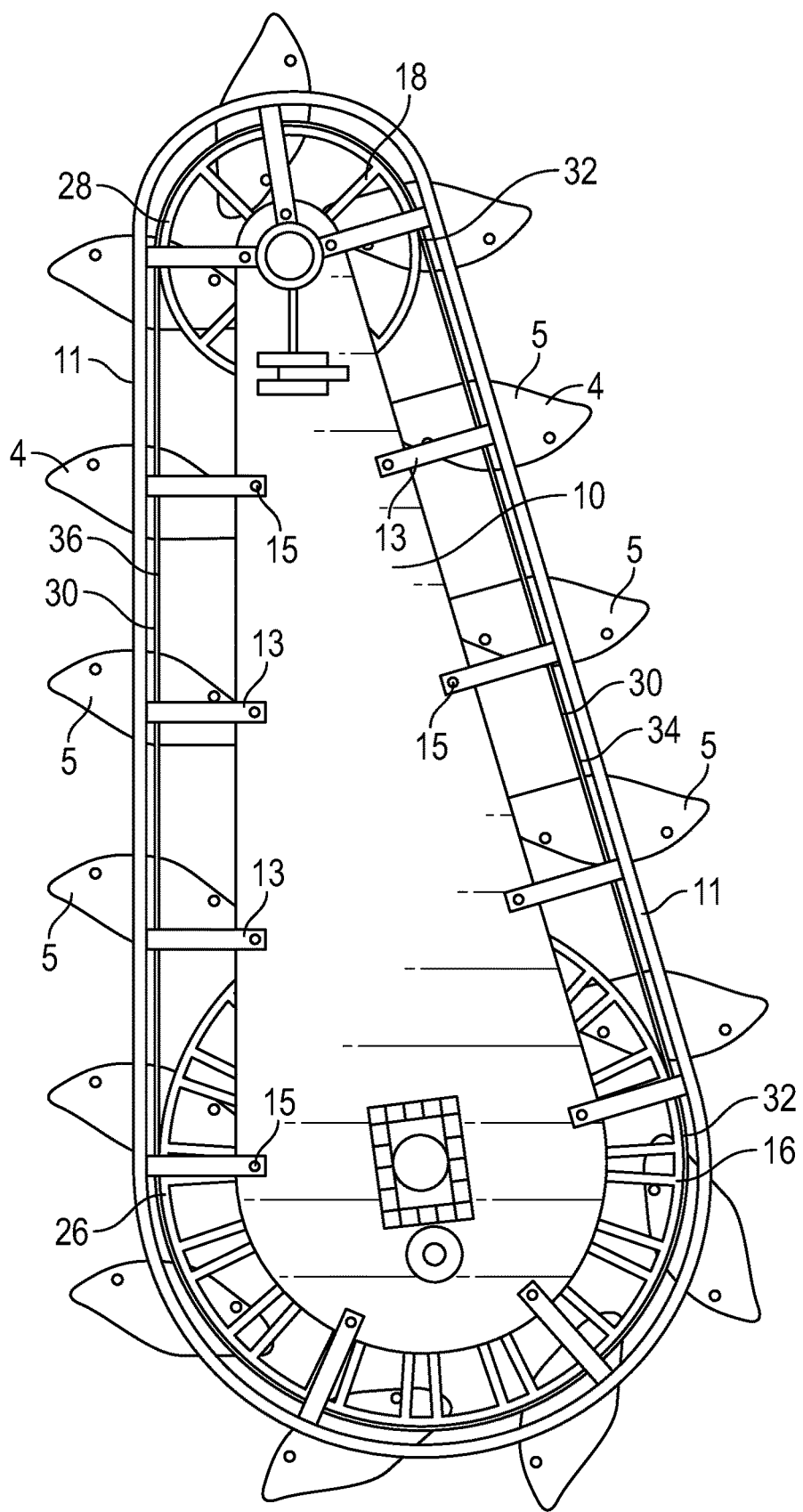
FIG. 3 is a side view of the wind energy device of FIG. 1.

Referring to FIG. 2, a top view of the wind energy device of FIG. 1 is illustrated, and referring to FIG. 3, a side view of the wind energy device of FIG. 1 is illustrated. As illustrated by FIGS. 1-3, the wind energy device includes a frame 10. In various implementations, the frame may include a first side 12 on a first side of the wind energy device and a second side 14 on a second side of the wind energy device opposing the first side. The first side 12 may be fixedly coupled to the second side 14 through one or more shafts or other portions of the frame. In various implementations the first horizontal axis 6 and the second horizontal axis 8 extend through the frame 10. As illustrated by FIG. 1, the wind energy device 2 includes a first rotor wheel 16, a second rotor wheel 18, a third rotor wheel 20, and a fourth rotor wheel 22 all coupled to the frame 10. Each of the rotor wheels may be configured to rotate about either the first horizontal axis 6 or the second horizontal axis 8. As illustrated by FIG. 1 the first 16 and third 20 rotor wheels may be considered the lower rotor wheels and the second 18 and fourth 22 rotor wheels may be considered the upper rotor wheels. While the majority of discussion of the rotor wheels herein is limited to the first rotor wheel 16 and the second rotor wheel 18, it is understood that the third rotor wheel 20 may be the same as or similar to the first rotor wheel 16 and the fourth rotor wheel 22 may be the same as or similar to the second rotor wheel 18.

In various implementations the diameters of the first rotor wheel 16 and the second rotor wheel 18 may be the same. In other implementations, and as is illustrated by FIGS. 1 and 3, the diameter of the first rotor wheel 16 may be larger than the diameter of the second rotor wheel 18, and in still other implementations, the diameter of the first rotor wheel 16 may be less than the diameter of the second rotor wheel 18. In various implementations, the first cable 30, and in turn the airfoils 4, may be configured to rotate 165 degrees about the upper end of the wind energy device and may be configured to rotate 195 degrees about the lower end of the wind energy device. In other implementations, the cable 30 may be configured to rotate more or less than these amounts. In particular implementations, the first rotor wheel 16 may have a radius of 1.77 meters and the second rotor wheel 18 may have a radius of 1.25 meters. In such implementations, the centers of the rotor wheels may be spaced 4 meters apart. In various implementations, and as illustrated by FIG. 3, the leading edge 26 of the first rotor wheel 16 may lie in the same vertical plane as the leading edge 28 of the second rotor wheel 18. In such implementations, the portion of the cable between the leading edges of the rotor wheels may be vertical. As used herein, vertical is used to define an orientation of the wind energy device or an element thereof when the wind energy device is installed for operation. Further, as used herein, "leading edge" refers to the side of the rotor wheel, airfoil, and/or wind energy device that faces the incoming wind while "trailing edge" refers to the side of the rotor wheel, airfoil, or wind energy device that faces away from the incoming wind. In various implementations, the portion 34 of the cable 30 between the trailing edges 32 of the rotor wheels may be sloped at 15 degrees relative to the portion 36 of the cable 30 between the leading edges of the rotor wheels. In other implementations, the relative sizes and positioning of the wheels may be varied and, in turn, the angles of the cables may be varied. Further, in other implementations the space between the rotor wheels may also be varied. In various implementations, a greater space between the rotor wheels may be provided in implementations where a greater number of airfoils are included in the wind energy device.

In various implementations, any of the rotor wheels may be spoked. In other implementations, the rotor wheels may include a solid plate eliminating the openings between the spokes. As illustrated by FIG. 1, in various implementations the wind energy device includes a first cable 30 (hereinafter "cable") coupled around the first rotor wheel 16 and the second rotor wheel 18. Similarly, the wind energy device may also include a second cable 38 coupled around the third rotor wheel 20 and the fourth rotor wheel 22. The second cable may be the same as or similar to the first cable. In other implementations, a belt or chain may be used in place of the cable. Implementations utilizing a belt may be smaller wind energy devices while the implementations utilizing cables may be larger wind energy devices. In implementations utilizing a chain, the rotor wheels may be cogs.

While the implementations disclosed herein discuss wind energy devices having four different rotor wheels, other implementations may include only two rotor wheels or more than four rotor wheels.

Referring to FIG. 1, in various implementations, the first 16 and third 20 rotor wheels are coupled about a first shaft 90 and the second 18 and fourth 22 rotor wheels are coupled about a second shaft 92. In other implementations each rotor wheel may be coupled about a separate shaft. In various implementations, the shafts may be fixed (unable to rotate). In other implementations, the shafts may be configured to rotate with the rotor wheels.

As illustrated by FIGS. 1-3, wind energy device 2 includes a plurality of airfoils 4 coupled to and between the first cable 30 and the second cable 38. The plurality of airfoils 4 are configured to rotate about the first horizontal axis 6 and the second horizontal axis 8 upon wind entering the leading edge of the wind energy device 2. Inasmuch as the airfoils may be fixed to the first cable 30 and the second cable 38, the airfoils 4 may rotate with the first cable 30 and the second cable 38.

As illustrated by FIGS. 1 and 3, in various implementations the airfoils 4 may include an end cap 5 on each end of each airfoil. In various implementations, the end cap may minimize any negative effect of the wind interacting with the ends of the airfoils 4.

Still referring to FIGS. 1 and 3, the wind energy device may include an auto pitch set mechanism 11. The auto pitch set mechanism may be configured to adjust the angle of attack, or pitch, of the plurality of airfoils 4. In various implementations, the auto pitch set mechanism 11 may include a plurality of supports 13 directly coupled to the frame 10. In various implementations, the supports may be configured to partially rotate about the axes 15. In such implementations, as the supports partially rotate, the auto pitch set mechanism 11 may be raised or lowered. The auto pitch set mechanism 11 may be configured to engage, at least temporarily, the plurality of airfoils 4. In such implementations, as the auto pitch set mechanism 11 is raised or lowered, the angle of attack of the airfoils 4 may be increased or decreased. In various implementations, a controller, which may be the same as or similar to any other controller disclosed herein, may be configured to direct one or more actuators to adjust the auto pitch set mechanism 11 to adjust angle of attack of the airfoils 4 optimized for and corresponding to the wind speed. The auto pitch set mechanism may be configured to adjust the angle of attack during operation of the wind energy device.

Figure 4:
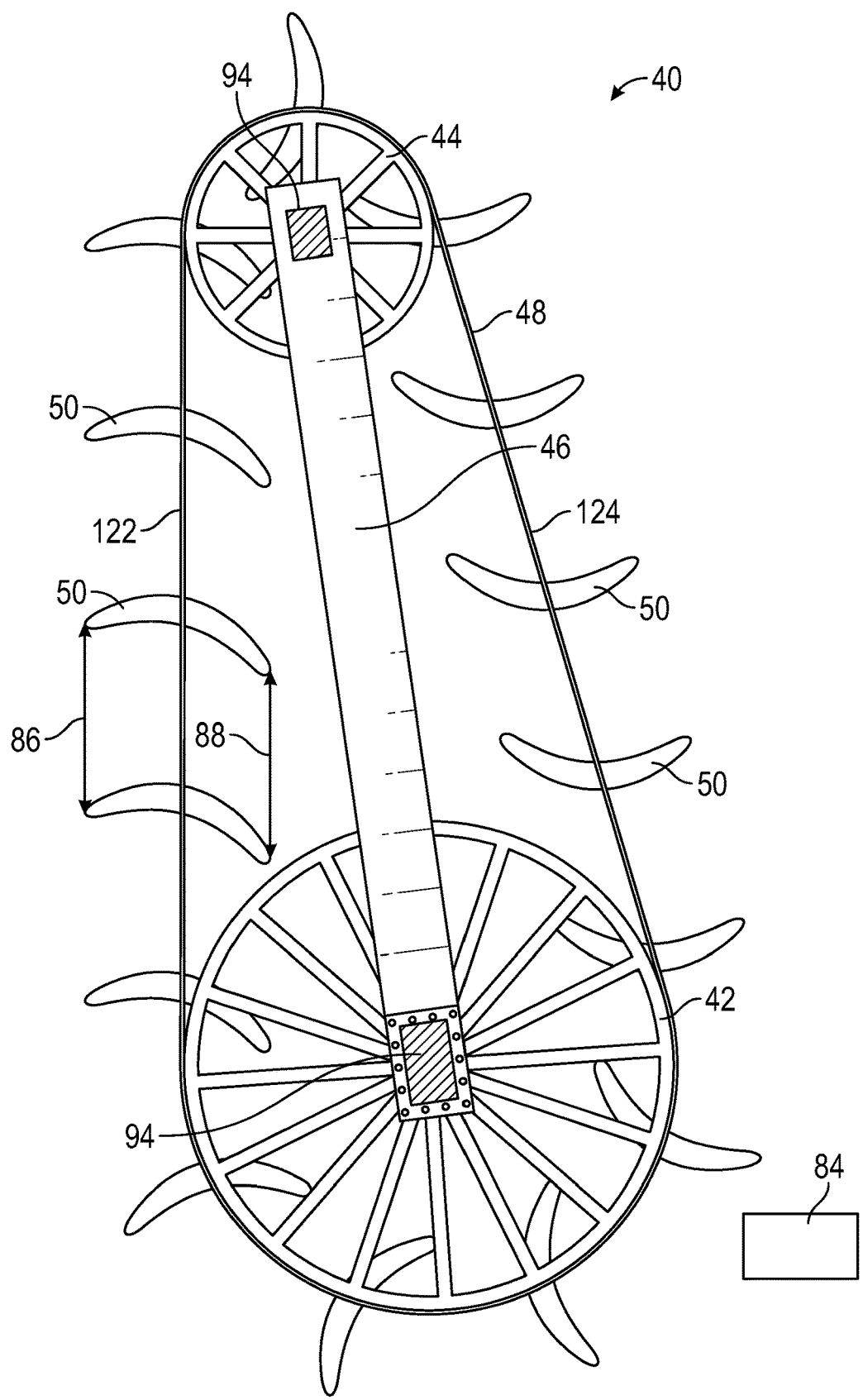
FIG. 4 is a side view of another implementation of a wind energy device.

Referring to FIG. 4, a side view of another implementation of a wind energy device is illustrated. It is understood that the elements and principles associated with FIG. 4 (or any other FIG. herein) may be applied to the implementation illustrated by FIG. 1 (or any other implementation herein). Further, while only a single side of the wind energy device 40 of FIG. 4 is illustrated, it is understood that the wind energy device includes an opposing side which may mirror the side illustrated (similar to the wind energy device illustrated by FIG. 1).

While the wind energy device 40 of FIG. 4 does not illustrate an auto pitch set mechanism, in various implementations the wind energy device 40 may include an auto pitch set mechanism the same as or similar to the auto pitch set mechanism 11 of FIGS. 1-3. Further, while the wind energy device 40 of FIG. 4 does not illustrate the airfoils 50 as having any end caps, in various implementations the airfoils 50 may include end caps the same as or similar to the end caps 5 of FIGS. 1 and 3.

The wind energy device 40 of FIG. 4 also includes a first rotor wheel 42, a second rotor wheel 44, and a frame 46 coupling the first rotor wheel 42 to the second rotor wheel 44. As illustrated by FIG. 4, the wind energy device 40 also includes a cable 48 coupled around the first rotor wheel 42 and the second rotor wheel 44.

Figure 6:
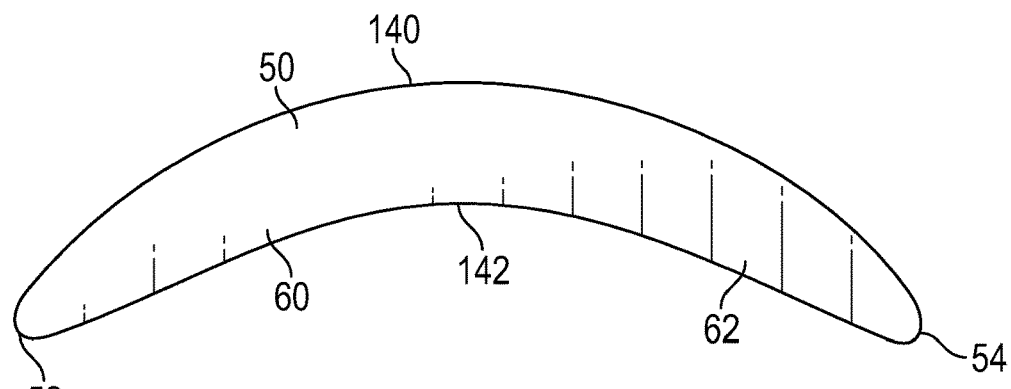
FIG. 6 is a cross-sectional side view of the airfoil of FIG. 5.

The wind energy device 40 includes a plurality of airfoils 50. As illustrated by FIG. 4, the wind energy device 40 may include 15 airfoils. Other implementations may include more or less than 15 airfoils. In various implementations the spacing between two adjacent airfoils 50 on the leading edge 122 or trailing edge 124 of the wind energy device may be the same as the chord length of the airfoils 50. As used herein, and as illustrated by FIG. 6, chord length is defined as the distance between the leading edge 52 and the trailing edge 54 of an airfoil 50. In other implementations, the chord length/space between adjacent airfoils ratio may be less than 1. In still other implementations, the chord length/space between adjacent airfoils ratio may be greater than 1. In various implementations, the wind energy device may include a chord length/space between adjacent airfoils ratio optimized for maximum power output.

Figure 5:
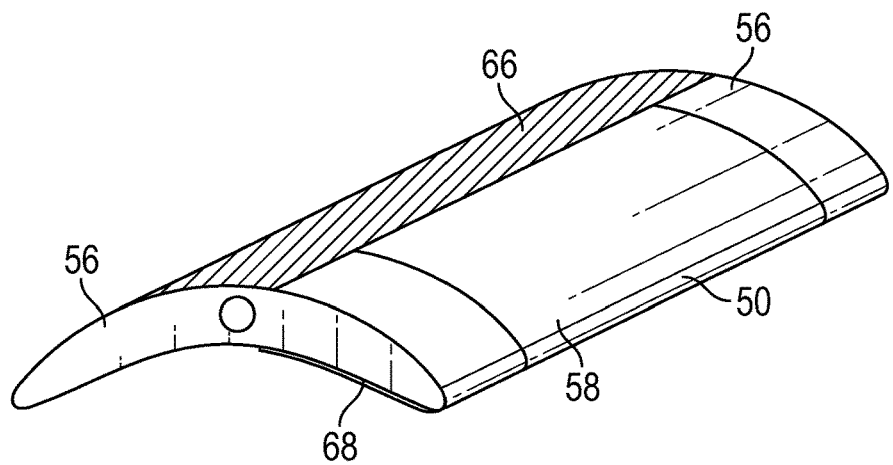
FIG. 5 is a side perspective view of an airfoil.

Referring to FIG. 5, a side perspective view of an airfoil is illustrated, and referring to FIG. 6, a cross-sectional side view of the airfoil of FIG. 5 is illustrated. In various implementations, the airfoils 50 may include a foam material coated with a resin. In other implementations the airfoils 50 may include aluminum, polymers, or any other type of material. As illustrated by FIG. 5, in various implementations the airfoil 50 may include solid end sections 56 and a hollow middle section 58. In other implementations, the entire airfoil may be solid. In various implementations, the airfoil may include a length of 1 meter. Other implementations of airfoils may have a length less than or greater than 1 meter, including 2.5 meters, 3 meters, and 5 meters.

The airfoils 50 may include a chord length optimized for maximum efficiency based upon the amount of space between adjacent airfoils. In various implementations, the airfoil 50 may include a thickness 15% of chord length. In other implementations, the thickness may be more or less than 15% of the chord length.

The airfoils 50 may have varying cambers. In particular implementations, the inlet angle of the leading edge of the airfoil may be 16 degrees. As used herein, the inlet angle is the angle between the camber of the leading edge of the airfoil and a horizontal plane. In such implementations, the substantially the first 50% 60 of the chord length of the airfoil 50 (which includes the leading edge) may have a camber optimized for maximum lift. As illustrated by FIG. 6, the second 50% 62 of the chord length of the airfoil (which includes the trailing edge) may be symmetrical or nearly symmetrical to the shape and camber of the first 50% of the airfoil (which includes the leading edge). Because of the symmetry about the midpoint, the lift on the rear half of the airfoil may be compromised. Since this portion of the airfoil provides only about 18% of the total upwards lift on the leading edge of the wind energy device, the compromise is seen as an advantage because of the benefits of the camber of the second 50% of the airfoil when the airfoil is flipped and on the trailing edge of the wind energy device outweigh the lift compromised on the leading edge of the wind energy device. More specifically, when the airfoils are reversed, the inlet angle of the reversed airfoils (which was the trailing edge of the airfoils on the leading edge of the wind energy device) is optimized to give maximum negative lift. In various implementations, and as illustrated by FIG. 6, a camber along the top 140 of the airfoil 50 may substantially correspond to a camber along the bottom 142 of the airfoil 50.

Figure 7:
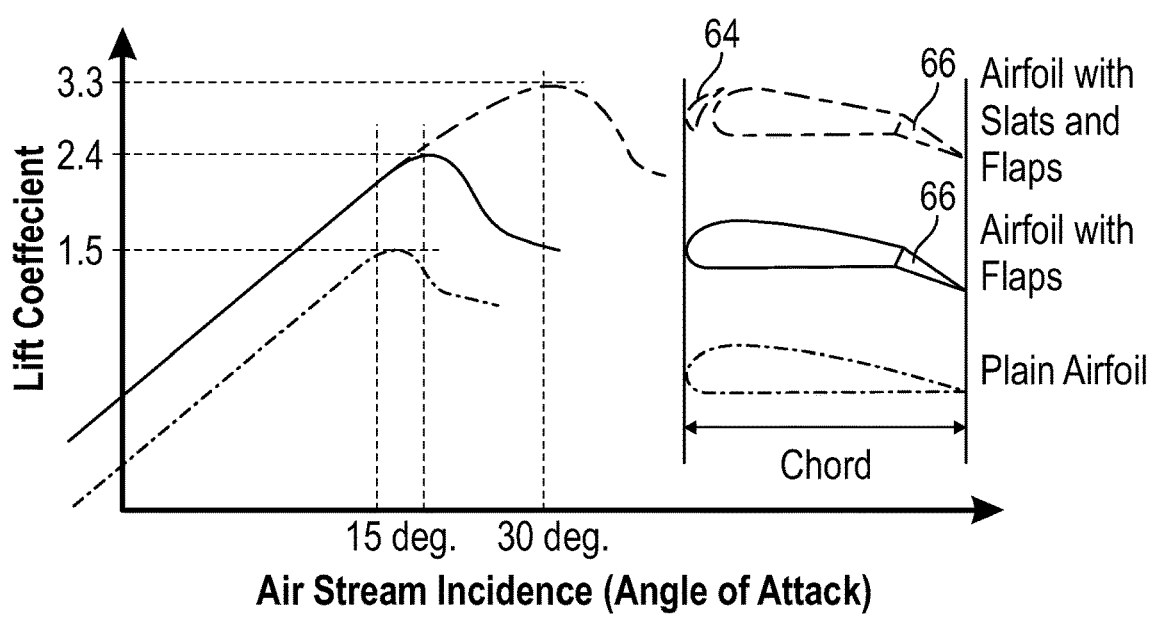
FIG. 7 is a chart illustrating the relation between airstream incidents and lift coefficients.

Referring to FIG. 7, a chart illustrating the relation between air stream incidence (or the angle of attack) and lift coefficients is illustrated. In various implementations the airfoil may include slats 62 or flaps 64 as illustrated by FIG. 7, which illustrates the lift coefficients of a variety of airfoil types. In such implementations, the addition of slats 62 and/or flaps 64 may optimize the upwards lift of the airfoils of the wind energy device. In still other implementations, the airfoils may include other shapes, dimensions, and geometries, including any shape, dimension, or geometry disclosed herein.

Referring back to FIG. 6, in various implementations one or more airfoils 50 may include a photovoltaic panel (hereinafter referred to as a "solar panel") integrated therein or coupled thereto. Similar solar panels are also illustrated on each of the airfoils of FIG. 11. The solar panels may conform to the shape of the airfoil. As illustrated by FIG. 6, the first solar panel 66 may cover 50% of the leading edge upper portion of an ascending airfoil. In various implementations, and as illustrated by FIG. 6, each airfoil may also include a second solar panel 68 covering 50% of the trailing edge lower portion of an ascending airfoil. In other implementations, the second solar panel 68 may cover 50% of the leading edge of the lower portion of an ascending airfoil. In such implementations, the first solar panel 66 may generate electricity when the airfoil 50 is ascending and the second solar panel 68 may generate electricity when the airfoil is descending. In other implementations the entire upper surface of the ascending airfoil may be covered by a solar panel.

In still other implementations, both the entire upper and lower surfaces may be covered by a solar panel. In still other implementations, other portions of the airfoil including more or less than what is described above may be covered by or include a solar panel. In various implementations the solar panel may be thin so as to not interfere with the dynamics of the airfoil. In implementations utilizing solar panels, the output of energy from the wind energy device may increase by as much as a factor of 3 during daylight hours.

Figure 8:
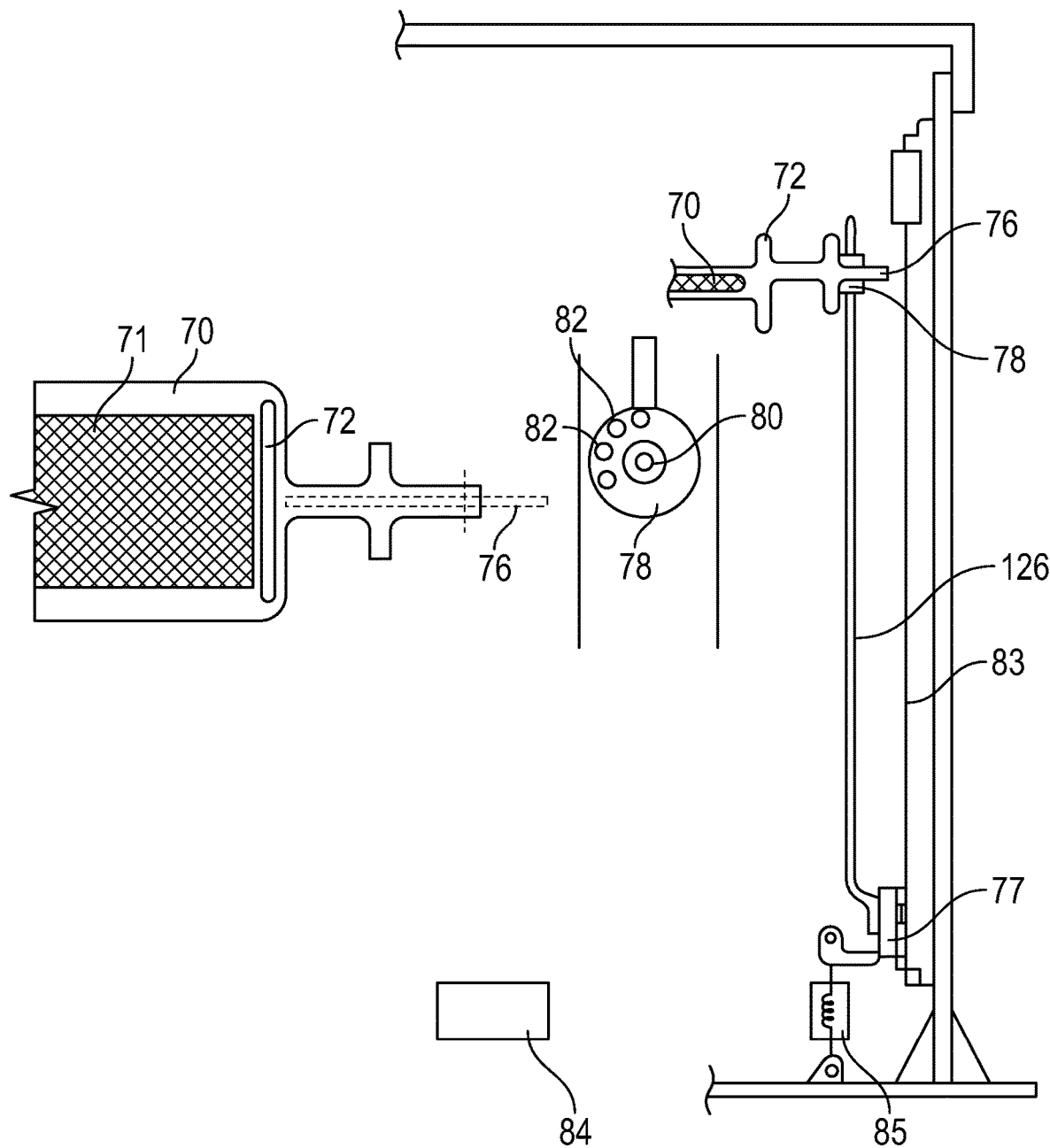
FIG. 8 is a diagram illustrating how an airfoil is attached to a remainder of a wind energy device.

Referring to FIG. 8, a diagram illustrating how an airfoil is attached to a remainder of a wind energy device is illustrated. Any element of FIG. 8 may be included in any implementation disclosed herein. As illustrated by FIG. 8, the left portion is a top view of the airfoil 70 and the right portion illustrates a side view of the airfoil 70 directly coupled to the remainder of the wind energy device. As illustrated by FIG. 8, in various implementations the airfoil 70 includes a hollow portion 71. As illustrated, in various implementations the airfoils 70 may include end caps 72 to minimize any negative effect of the wind at the end of the airfoil 70. In various implementations, the airfoil may be coupled to a reinforcement rod 76 which may be coupled to a cascade mount plate 78. The end of the airfoil may be mounted through a hole 80 and/or a bushing bearing of the cascade mount plate 78. In various implementations, the airfoil may be locked into place within the hole and/or bushing bearing through a locking mechanism. In various implementations, the locking mechanism may include a pin at the end of the airfoil protruding through the mount plate. In various implementations, the cascade mount plate may be fixedly coupled (bolted, welded, etc.) to linear bearings. In various implementations, the end of the airfoil 70 mounted to the cascade mount plate 78 may include holes 82 to align with a particular angle of attack lock used to adjust the angle of attack. In various implementations, the positioning of the cascade mount plate may be automated. In such implementations, an auto pitch set mechanism 126 may be activated by the controller 84 and may be configured to adjust the angle of the leading edge of the airfoils (or angle of attack) to maximize efficiency of the wind energy device based upon the wind speed and the desired energy output. The auto pitch set mechanism 126 may include any elements of features of the auto pitch set mechanism 11 of FIGS. 1-3. As illustrated by FIG. 8, the wind energy device may include a lift force measurement device 85, attached to the lower bearing housing 77, to measure the lift (both upward and downward) of the airfoils 70 of the wind energy device. In various implementations, the wind energy device may also include a spring to serve as a tensioning device for the cable 83. The spring may be attached to the bottom bearing housing which in turn may be configured to couple to the cable. In various implementations, the spring may be included in the lift measurement device.

In various implementations, the angle of attack of the airfoils may be adjusted to optimize the amount of power generated. As used herein, the angle of attack is defined as the angle between the chord line (or a straight line between a front end and back end of the chord) and the vector of incoming wind (which can often be considered as horizontal or flat). The angle of attack may be either adjusted manually or autonomously by a controller of the wind energy device. In various implementations, the angle of attack of the airfoils on the leading edge of the wind energy device may be between 15 and 30 degrees. In more particular implementations, the angle of attack of the airfoils on the leading edge of the wind energy device can be between 15 and 19 degrees. In other implementations, the angle of attack may be more than 30 degrees or less than 15 degrees. Further, in various implementations the angle of attack may be the same for each airfoil. In other implementations, the airfoils may include different angles of attack.

Referring back to FIG. 4, in various implementations of wind energy devices, the space between the leading edges of adjacent airfoils on the leading edge of the wind energy device (the inlet area 86) may be greater than the space between the trailing edges of adjacent airfoils on the leading edge of the wind energy device (the exit area 88). In such implementations, the velocity of the air passing through the leading edge of the wind energy device may be accelerated in a downward direction. This may generate a downward or negative impulse which may increase the negative lift of the airfoils on the trailing edge of the wind energy device.

The implementations of the wind energy devices disclosed herein operate as wind passes around the airfoils on the leading edge of the wind energy device, resulting in lift of the airfoils and rotation of the cable and rotor wheels. Further, as the wind hits and passes over the reversed airfoils on the trailing edge of the wind energy device, a negative lift on the reversed airfoils is generated, further facilitating rotation of rotor wheels. The implementations disclosed herein may vary the number of airfoils, the length of the airfoils, the chord length of the airfoils, the spacing between the airfoils, and the geometry of the airfoils (camber, incident angle, angle of attack, etc.) in order to increase and optimize the power generated by the generators coupled to the rotor wheels. More specifically, in various implementations, the shape of the airfoil may be changed, including, by non-limiting example, the angles of the airfoil, the camber of the airfoil, the thickness ratio of the airfoil, the shape of the leading edge of the airfoil, the shape of the trailing edge of the airfoil, or any other physical characteristic of the airfoil, to optimize energy production from the wind energy device. In various implementations disclosed herein, the trailing edge portion of the airfoils (or the airfoils moving in a downward position) may be configured to generate more downward force than the leading-edge portion of the airfoils (or airfoils moving in an upwards direction) generate upward force. In such implementations, the downward force may be generated from the shape of the camber of the trailing edge of the airfoils, the angle of attack of the trailing edge portion of the airfoils, and/or the downward impulse generated by the trailing edge of the leading-edge portion of airfoils.

Referring back to FIG. 4, in various implementations, the wind energy devices may include one or more generators 94 and/or clutches coupled to any of the rotor wheels. The one or more generators 94 may be coupled within a hub of any of the first rotor wheel, second rotor wheel, third rotor wheel, and/or fourth rotor wheel. In particular implementations, the wind energy device may include four generators, each generator associated with a separate rotor wheel. In other implementations the wind energy device may include only one generator, two generators, three generators, or more than four generators. As the airfoils are lifted and rotate about the wind energy device, the rotor wheels may rotate and the generators may generate power.

In various implementations, the generators may be of the same or different sizes. In particular implementations, the wind energy device may be configured to operate off of one generator during periods of low wind. When wind increases, the wind energy device, through a controller 84, may be configured to bring on one or more generators to increase the efficiency. Alternatively, when wind decreases, the wind energy device, through the controller 84, may be configured to prevent one or more generators from generating electricity through engaging one or more clutches corresponding with the one or more generators to increase the efficiency of the wind energy device. Accordingly, the number of generators operating may be varied through the controller 84 in order to maximize efficiency. In various implementations, greater control of the energy produced can be achieved if a generator is at the both ends of both shafts.

Still referring to FIG. 4, in various implementations the wind energy device includes a controller 84 communicatively coupled to the generator 94. In implementations having more than one generator, the controller may be coupled to all of the generators. The controller 84 may be wirelessly coupled to the remainder of the wind energy device or physically wired to the remainder of the wind energy device. In various implementations, the airfoil velocity, or the speed of rotation of the plurality of airfoils 50, may be controlled by a controller. Further, in various implementations the off take, or the amount of power generated, by one or more generators may also be controlled by the controller 84. The controller 84 may be configured to measure the available torque on the shafts of the wind energy device 40 and in turn control the output of electric current by determining the electronic load off take (via the generators) as a function of the wind velocity, the number of airfoils exposed to the wind, and the load requirement. The controller 84 may utilize an algorithm having inputs of the number of airfoils (which is a constant), the load requirement (which is a variable), and the wind speed (which is also a variable and which may be determined by the velocity of the airfoil rotation). With these inputs the algorithm may be able to evaluate the lift of the airfoils and convert the lift to torque on the shafts. By ensuring the airfoils rotate at a constant speed, (which may be a low speed in low wind conditions or a higher speed in higher wind conditions) the controller may facilitate optimal output and efficiency of the generators. As such, the controller 84 may be configured to limit the speed of rotation of the plurality of airfoils in order to maintain the speed of rotation of the plurality of airfoils to maximize the efficiency of the wind energy device.

Further, because the optimal angle of attack is a result of the wind velocity vector and the airfoil velocity vector as the airfoils rotate in the wind energy device, in various implementations the angle of attack may be optimized through the controller over the entire operating range by determining the angle of attack using the controller and adjusting the angle of attack through an auto pitch set mechanism.

Figure 9:
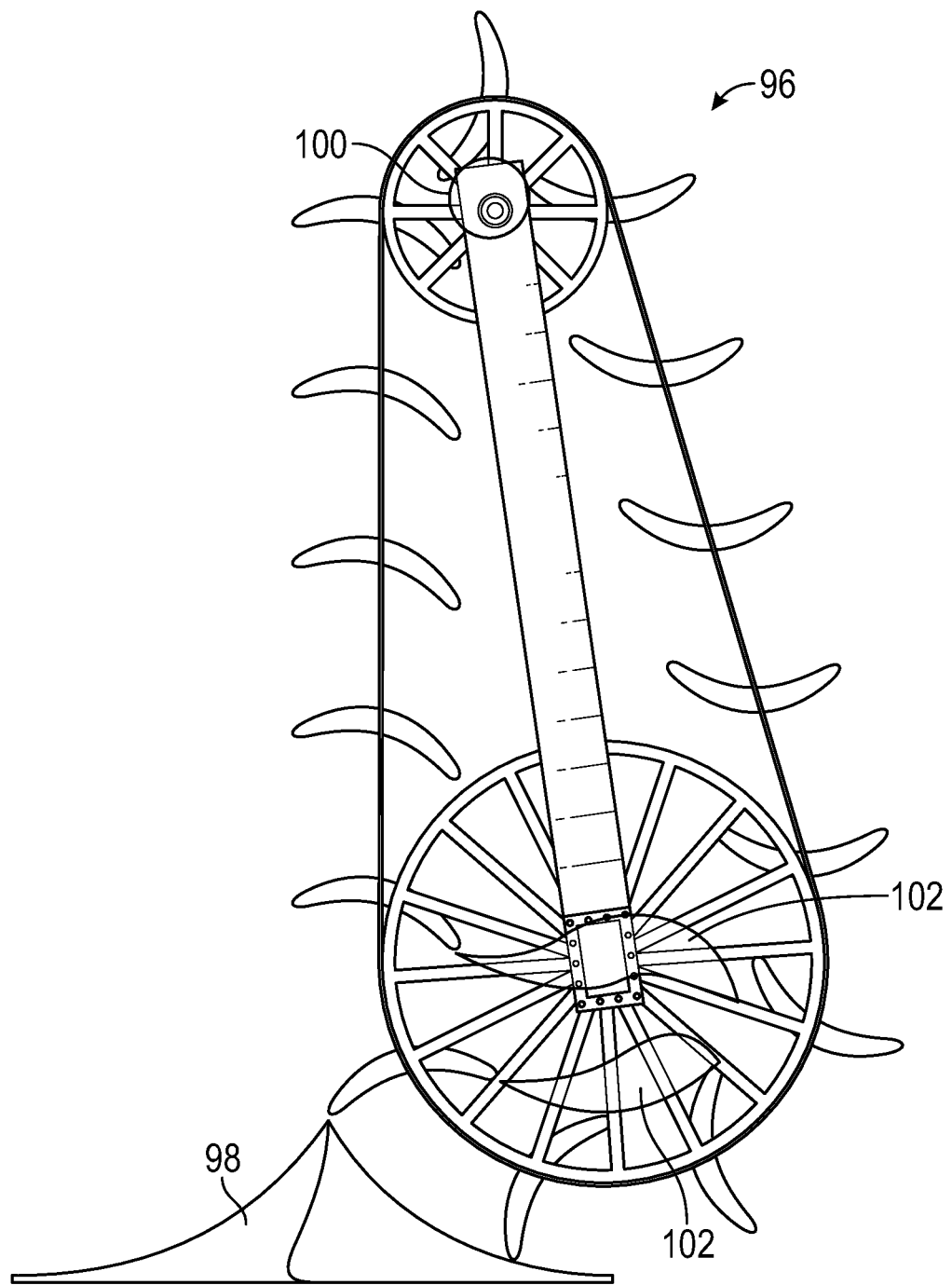
FIG. 9 is a side view of a wind energy device including multiple cowls.

Referring to FIG. 9, a side view of a wind energy device including a plurality of cowls is illustrated. As used herein, a cowl is a device configured to smooth the airflow through the wind energy device. In various implementations, the wind energy device 96 may include a lower cowl 98 positioned in front of the base of the leading edge of the wind energy device and configured to redirect air away from the airfoils rotating about the very bottom of the wind energy device. In various implementations the wind energy device 96 may include a cowl 100 near an upper shaft of the wind energy device to smooth the airflow at the top of the wind energy device. Similarly, the wind energy device 96 may also include one or more cowls 102 near the lower shaft of the wind energy device to smooth the airflow at the bottom of the wind energy device. While cowls 100 and 102 are illustrated as transparent and on the side of the wind energy device, they are illustrated as such in order to better illustrate the position of the cowls which is between the two lower rotor wheels and/or between the two upper rotor wheels. Cowls 100 and 102 are within a space created by the rotating airfoils. While implementations of wind energy devices disclosed herein may include any or all of the cowls illustrated by FIG. 9, other implementations of wind energy devices may include other types and/or designs of cowls, such as, by non-limiting example, upper cowls positioned in front of the top of the wind energy device.

In other implementations, a lower portion of the wind energy device and/or upper portion of the wind energy device may be blocked in order to prevent any wind from passing through these portions. The lower portion may include the portion of the wind energy device below a center of the first and third rotor wheels and the upper portion may include the portion of the wind energy device above a center of the second and fourth rotor wheels.

Figure 10:
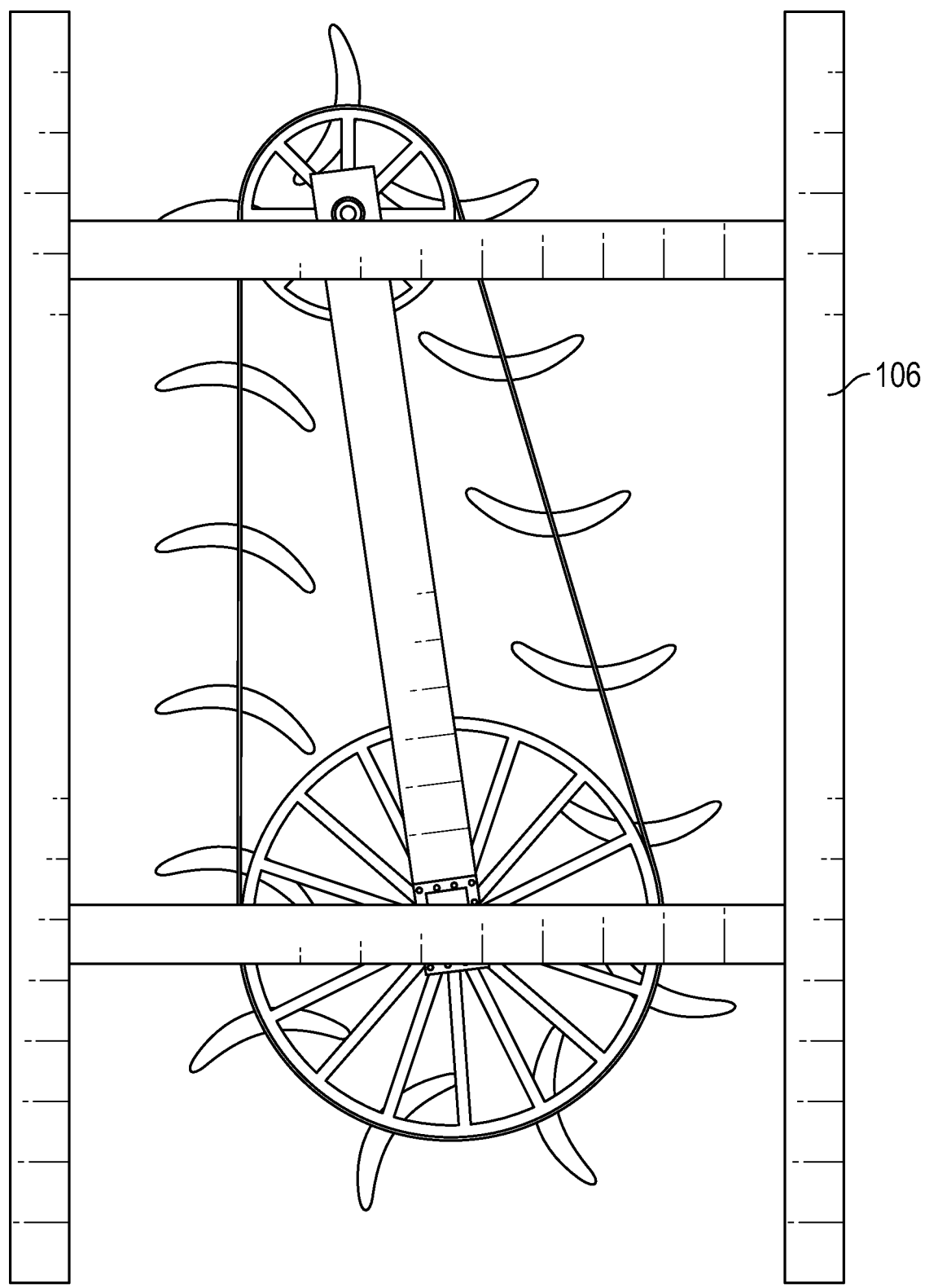
FIG. 10 is a side view of a wind energy device having a frame.

Referring to FIG. 10, a side view of a wind energy device coupled to a frame is illustrated. In various implementations, the frame 106 may be a simple rectangular frame. In other implementations, the frame may be another type of frame. The frame may be made from, by non-limiting example, aluminum, steel, other metals, polymers, composite materials, or any other type of material.

Figure 11:
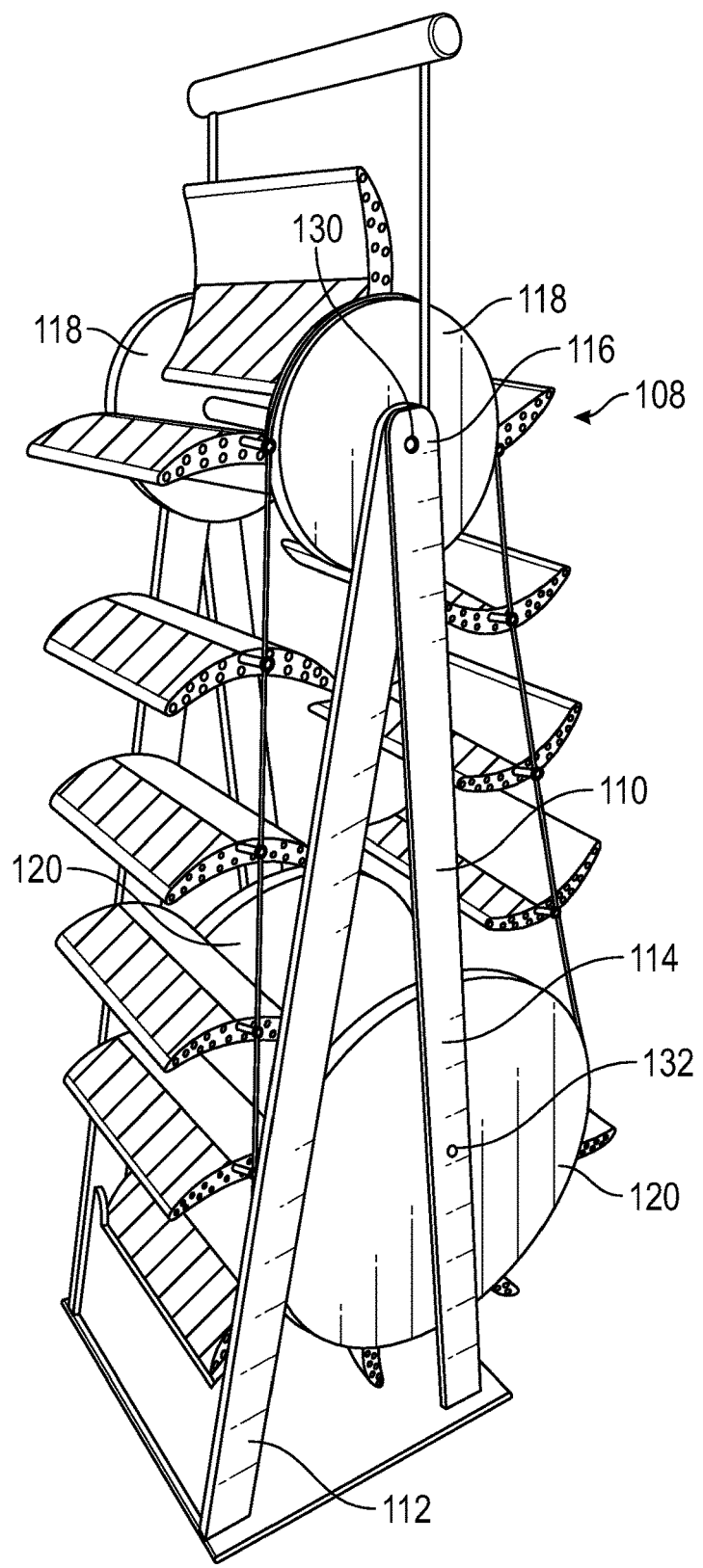
FIG. 11 is another implementation of a wind energy device having another implementation of a frame.

Referring to FIG. 11, another implementation of a wind energy device having another implementation of a frame is illustrated. In various supplementations, the wind energy device 108 may include an A-frame 110. As illustrated by FIG. 11, the A-frame may include a first support 112 directly coupled to a second support 114 at an upper portion 116 of the wind energy device. The frame may include the first support and the second support on two opposing sides of the wind energy device. In various implementations, the upper rotor wheels 118 are aligned with a center of the A-frame and may pass through both support 112 and support 114 when support 114 and support 112 overlap one another. In such implementations, the lower rotor wheels 120 may rotate about an axis extending through a lower portion of the second support 114. In various implementations, the lower rotor wheels may have a larger diameter than the upper rotor wheels. In such implementations, because the center 130 of the upper rotor wheels are not vertically aligned with the center 132 of the lower rotor wheels, the leading edge the upper rotor wheels and the lower rotor wheels may be aligned in the same vertical plane.

In various implementations the wind energy device may be 4 meters wide by 4 meters long. Other implementations may include widths and lengths less than and/or greater than 4 meters. Further, the height of the wind energy device may vary.

In various implementations, the wind energy devices disclosed herein may be configured to rotate about a vertical axis. In such implementations, the wind energy devices may be able to rotate to face the direction of the incoming wind.

In various implementations the wind energy devices may be configured to couple on top of a building. In other implementations, the wind energy devices may be configured to be deployed in other areas having wind.

In places where the description above refers to particular implementations of wind energy devices and implementing components, sub-components, methods and sub-methods, it should be readily apparent that a number of modifications may be made without departing from the spirit thereof and that these implementations, implementing components, sub-components, methods and sub-methods may be applied to other wind energy devices.

What is claimed is:

1. A wind energy device comprising:
   a frame coupled to each of a first rotor wheel, a second rotor wheel, a third rotor wheel and a fourth rotor wheel;
   a first cable configured to rotate about the first rotor wheel and the second rotor wheel;
   a second cable configured to rotate about the third rotor wheel and the fourth rotor wheel;
   a plurality of airfoils coupled between the first cable and the second cable, wherein the plurality of airfoils is configured to rotate with the first cable and the second cable;
   a first generator coupled to one of the first rotor wheel, the second rotor wheel, the third rotor wheel, or the fourth rotor wheel;
   a second generator coupled to one of the first rotor wheel, the second rotor wheel, the third rotor wheel, or the fourth rotor wheel; and
   a controller coupled to the first generator and the second generator;
   wherein the controller is capable of controlling a speed of rotation of the plurality of airfoils;
   wherein each airfoil of the plurality of airfoils includes a leading-edge portion and a trailing edge portion; and
   wherein the trailing edge portions of the plurality of airfoils is configured to generate more downward force than the leading-edge portions of the plurality of airfoils generate upward force.

2. The wind energy device of claim 1, wherein substantially half of a first side of the leading edge portion of each airfoil of the plurality of airfoils comprises a first solar panel and substantially half of a second side of the trailing edge portion of each airfoil comprises a second solar panel.

3. The wind energy device of claim 1, wherein the first rotor wheel and third rotor wheel have a greater diameter than the second rotor wheel and the fourth rotor wheel.

4. The wind energy device of claim 1, wherein a space between a first leading edge of a first airfoil and a second leading edge of an adjacent second airfoil is greater than a space between a first trailing edge of the first airfoil and a second trailing edge of an adjacent second airfoil.

5. The wind energy device of claim 1, further comprising a third generator coupled to the third rotor wheel and a fourth generator coupled to the fourth rotor wheel.

6. The wind energy device of claim 1, wherein the plurality of airfoils is configured to generate a downward impulse when a stream of air strikes a plurality of leading edges of the plurality of airfoils.

7. A wind energy device comprising:
   a frame coupled to each of a first rotor wheel, a second rotor wheel, a third rotor wheel and a fourth rotor wheel;
   a first shaft coupled between the first rotor wheel and the third rotor wheel;
   a second shaft coupled between the second rotor wheel and the fourth rotor wheel;
   a first cable configured to rotate about the first rotor wheel and the second rotor wheel;
   a second cable configured to rotate about the third rotor wheel and the fourth rotor wheel;
   a plurality of airfoils coupled between the first cable and the second cable, wherein the plurality of airfoils are configured to rotate with the first cable and the second cable;

a generator coupled to one of the first rotor wheel, the second rotor wheel, the third rotor wheel, or the fourth rotor wheel; and a controller coupled to the generator;

wherein the controller is capable of limiting a speed of rotation of the plurality of airfoils and maintaining the speed of rotation of the plurality of airfoils;

wherein each airfoil of the plurality of airfoils includes a chord length that is the same distance as a distance between two adjacent airfoils;

wherein each airfoil of the plurality of airfoils includes a leading-edge portion and a trailing edge portion; and wherein the trailing edge portions of the plurality of airfoils is configured to generate more downward force than the leading-edge portions of the plurality of airfoils generate upward force.

8. The wind energy device of claim 7, wherein the controller is capable of computing an available torque on the first shaft and controlling an output of electric current.

9. The wind energy device of claim 7, further comprising a second generator, a third generator, and a fourth generator, each generator coupled to one of the first rotor wheel, the second rotor wheel, the third rotor wheel, or the fourth rotor wheel.

10. The wind energy device of claim 9, wherein the controller is capable of determining which of the generator, the second generator, the third generator, and the fourth generator generate power based upon a velocity of the plurality of airfoils.

11. The wind energy device of claim 7, wherein a thickness of a middle section of each airfoil of the plurality of airfoils is 15% of the chord length of each airfoil of the plurality of airfoils.

12. The wind energy device of claim 7, wherein a leading edge of each airfoil of the plurality of airfoils is symmetrical with respect to a trailing edge of each airfoil of the plurality of airfoils.

13. The wind energy device of claim 7, wherein an angle between a plane formed through a leading edge of the first cable and second cable and a plane formed between a trailing edge of the first cable and second cable is 15 degrees.

14. A wind energy device comprising:

a frame coupled to each of a first rotor wheel, a second rotor wheel, a third rotor wheel and a fourth rotor wheel;

a first cable configured to rotate about the first rotor wheel and the second rotor wheel;

a second cable configured to rotate about the third rotor wheel and the fourth rotor wheel;

a plurality of airfoils coupled between the first cable and the second cable, wherein the plurality of airfoils is configured to rotate with the first cable and the second cable;

a generator coupled to one of the first rotor wheel, the second rotor wheel, the third rotor wheel, or the fourth rotor wheel; and a controller coupled to the generator;

wherein the controller is capable of limiting a speed of rotation of the plurality of airfoils and maintaining the speed of rotation of the plurality of airfoils; and wherein each airfoil of the plurality of airfoils includes a leading-edge portion and a trailing edge portion; and wherein the trailing edge portions of the plurality of airfoils is configured to generate more downward force than the leading-edge portions of the plurality of airfoils generate upward force.

15. The wind energy device of claim 14, wherein the frame comprises an A-frame comprising a first support directly coupled to a second support at a top of the A-frame.

16. The wind energy device of claim 14, wherein an angle of attack of a leading edge of the plurality of airfoils is between 15-30 degrees.

17. The wind energy device of claim 14, wherein the plurality of airfoils is configured to generate a downward impulse when a stream of air strikes a plurality of leading edges of the plurality of airfoils.

18. The wind energy device of claim 14, wherein the first cable is configured to rotate 195 degrees about the first rotor wheel and the first cable is configured to rotate 165 degrees about the second rotor wheel.

19. The wind energy device of claim 14, further comprising a second generator, wherein the controller is configured to determine which of the generator and the second generator generate power based upon a velocity of the plurality of airfoils.

20. The wind energy device of claim 14, wherein the controller is configured to adjust an angle of attack of the plurality of airfoils during operation of the wind energy device based upon a wind speed.

* * * * *